US005297215A

United States Patent [19]
Yamagishi

[11] Patent Number: 5,297,215
[45] Date of Patent: Mar. 22, 1994

[54] APPARATUS AND METHOD OF DISPLAYING MEDICAL IMAGES OF SLICED TISSUE

[75] Inventor: Ichiro Yamagishi, Tochigi, Japan

[73] Assignee: Kabushiki Kaisha Toshiba, Kanagawa, Japan

[21] Appl. No.: 714,026

[22] Filed: Jun. 12, 1991

[30] Foreign Application Priority Data

Jun. 13, 1990 [JP] Japan .................. 2-155788

[51] Int. Cl.⁵ .............................. G06K 9/00
[52] U.S. Cl. ................... 382/6; 364/413.06; 395/119
[58] Field of Search ........... 364/413.16, 413.2, 413.21; 395/119, 140; 382/6, 54

[56] References Cited

U.S. PATENT DOCUMENTS

| 4,216,526 | 8/1980 | Karwowski | 382/6 |
| 4,858,129 | 8/1989 | Mori . | |
| 4,868,747 | 9/1989 | Mori et al. | 364/413.16 |
| 5,034,987 | 7/1991 | Fujimoto et al. | 382/6 |

OTHER PUBLICATIONS

Y. Iwai et al., Medical Imaging Equipment, Corona Publishing Co., Ltd. Dec. 20, 1988, pp. 65–73.

*Primary Examiner*—David K. Moore
*Attorney, Agent, or Firm*—Finnegan, Henderson, Farabow, Garrett & Dunner

[57] ABSTRACT

An apparatus and method are specialized in utilizing a three-dimensional(3-D) time-dependent image data, which is obtained by dynamic scanning in devices such as an X-ray computed tomography device. The dynamic scanning is carried out at a fixed slice layer in a patient body at a certain time interval. When an line-selecting line is set in a 2-D scanned image, a part of the 3-D time-dependent image data, displayed on the TV monitor, the data corresponding to the designated line in the 3-D time-dependent image data can be converted into a 2-D time-dependent image data by an image data conversion unit. The 2-D time-dependent image data is displayed on the monitor and it appears as degrees of density on the screen and shows dynamical image changing with the scanning time. Moreover, when profile-selecting line is designated in the 2-D time-dependent image, a profile forming unit forms a profile data concerning image data values at an axis designated by the profile-selecting line. The profile data is visualized as a time curve on the monitor, and offers a quantitative analysis.

11 Claims, 7 Drawing Sheets

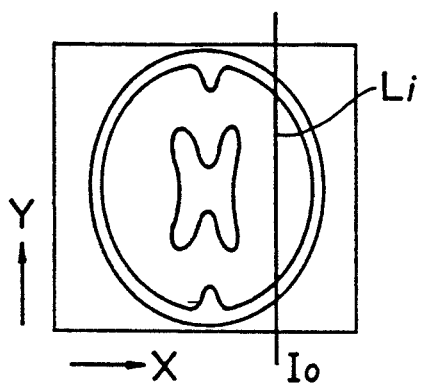
FIG. 5
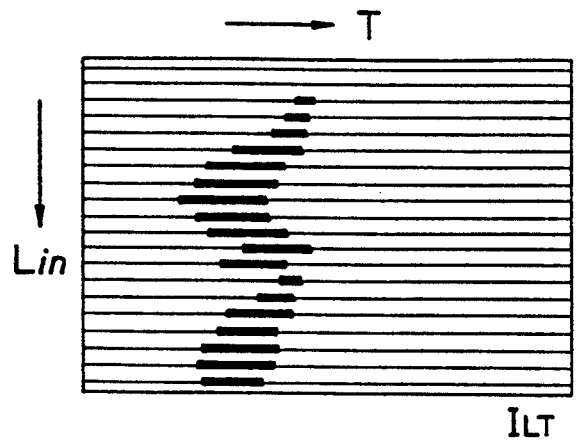
FIG. 6B
| | SCANNING TIME T | | | | | |
|---|---|---|---|---|---|---|
| POSITION ON LINE $L_i$ | $T_0$ | $T_1$ | $T_2$ | $T_3$ | ... | $T_n$ |
| $L_{i1}$ | $ct_{01}$ | $ct_{11}$ | $ct_{21}$ | $ct_{31}$ | | $ct_{n1}$ |
| $L_{i2}$ | $ct_{02}$ | $ct_{12}$ | $ct_{22}$ | $ct_{32}$ | | $ct_{n2}$ |
| $L_{i3}$ | $ct_{03}$ | $ct_{13}$ | $ct_{23}$ | $ct_{33}$ | | $ct_{n3}$ |
| $L_{i4}$ | $ct_{04}$ | $ct_{14}$ | $ct_{24}$ | $ct_{34}$ | | $ct_{n4}$ |
| ⋮ | | | | | | |
| $L_{in}$ | $ct_{0n}$ | $ct_{1n}$ | $ct_{2n}$ | $ct_{3n}$ | | $ct_{nn}$ |
$Ct_{nn}$ ; CT value
FIG. 6A

APPARATUS AND METHOD OF DISPLAYING MEDICAL IMAGES OF SLICED TISSUE

BACKGROUND OF THE INVENTION

The present invention relates to an apparatus and method for displaying medical images of a sliced tissue in the body of a patient, and more particularly, relates to the apparatus and method for displaying modified forms of time-dependent image data obtained by dynamic scanning at the sliced tissue.

In conventional medical diagnoses, medical examinations using imaging methods such as X-ray computed tomography(CT), nuclear magnetic resonance(NMR), and nuclear medicine(NM) have been frequently carried out to obtain time-dependent image data at a lesion of a patient, the image data permitting a clearer understanding of diseases.

In examinations by the X-ray CT, for instance, a dynamic study has been widely known for detecting the time-dependent image data. The dynamic study is an up-to-date manner, in which the flow of contrast medium can be observed as a substitute for time-dependent information showing motion of blood vessels or organs after a bolus-injection of the medium into a lesion.

The dynamic study with the X-ray CT apparatus first includes a plurality of scanning processes. These scanning processes are carried out at a fixed slice position in the patient is body at a certain time interval after a single injection of contrast medium therein. A slicing tissue will be set to be parallel to the X-Y plane when the longitudinal axis of a patient is aligned with the Z axis of a Cartesian coordinate system. The scanning collects a plurality of two-dimensional (2-D) image data throughout the sliced tissue. Next, a region of interest-(ROI) is designated by an operator at a desired position or an area(e.g., round-shaped or rectangular-shaped) on a display screen showing a sliced 2-D image. The area of the ROI is normally set to be rather small in order to maintain high accuracy for observation. A processor of the apparatus, then, calculates a mean value of the CT values within the each area corresponding to the ROI through all scanned 2-D image data. Finally, a profile-(i.e., time-density curve) of the mean values is formed and visualized on the screen.

The dynamic study is able to show a profile about CT values qualitatively, but the profile covers only the area of the designated ROI. Then, for inspecting a generality of a doubtful lesion, if it is required to display the time-dependent profile or information with a longer or wider scope in comparison with the above narrow ROI, the operator has to repeat the above-described dynamic study with relocating the ROI. As a result, a diagnosis for one patient requires frequently cumbersome operations.

SUMMARY OF THE INVENTION

Accordingly, it is a primary object of the present invention to provide a displaying apparatus and method capable of displaying a 2-D time-dependent image with a wider or longer scope on a sliced 2-D image obtained by dynamic scanning in addition to less operations.

It is another object of the present invention to provide a displaying apparatus, in which the time-dependent information is almost continuous about time.

Another primary object of the present invention is to provide a displaying apparatus and method capable of displaying a time curve representing a profile for image data at a desired position on the 2-D time-dependent image.

It is a further object of the present invention to provide a displaying apparatus, in which the time curve is almost continuous about time.

It is a still further object of the present invention to provide a displaying apparatus capable of designating a simple ROI with a line.

It is a still further object of the present invention to provide a displaying apparatus capable of designating a more reliable ROI with a rectangular.

It is a still further object of the present invention to provide a displaying apparatus, in which all the images are visualized on a same display.

These and other objects can be achieved according to the present invention, in one aspect by providing, an apparatus for displaying medical images comprises image data store means for storing at least one three-dimensional(3-D) time-dependent image data consisting of a plurality of two-dimensional(2-D) image data collected throughout a sliced 2-D tissue in a biological body to be examined by dynamic scanning of a certain time interval; scanned image display means for displaying one of a plurality of the scanned 2-D image data; ROI designating means for designating a region of interest(ROI) elongated along a direction in the 2-D image displayed on the scanned image display means; image data converting means for converting one 3-D time-dependent image data to one 2-D time-dependent image data having two axes, one representing the scanning time, the other representing, at each scan, image data at each position designated by the ROI designating means; and 2-D time-dependent image display means for displaying the 2-D time-dependent image data converted by the image data converting means.

In another aspect according to the present invention, there is also provided an apparatus for displaying medical images, further comprising profile designating means for designating a position in the image data axis of the 2-D time-dependent image displayed on the 2-D time-dependent image display means; profile data forming means for forming a profile data of image data values in relation to the scanning time versus the position designated by the profile designating means; and profile display means for displaying the profile data formed by the profile data forming means.

Preferably the image data converting means fits image data between the scanning intervals by using a gamma interpolation. The profile data forming means also fits image data between the scanning intervals by using a gamma interpolation. It is also preferred that the ROI designating means designates a linear ROI or a rectangular ROI. The image data converting means preferably calculates a mean value as a representative value on each transverse of the rectangular ROI.

It is also preferred that the 3-D time-dependent image data stored in the image data store means is supplied by a medical imaging system, and preferably the medical imaging system employs an X-ray computed tomography device.

BRIEF DESCRIPTION OF THE DRAWINGS

The accompanying drawings which are incorporated in and constitute a part of this specification, illustrate embodiments of the invention and, together with the description, serve to explain the principles of the invention; in which:

FIG. 5 is a display illustration showing one of a plurality of scanned 2-D image; 5 FIG. 6A is a matrix illustrating a 2-D time-dependent image data obtained in the embodiment;

FIG. 6B is a pictorial display illustration showing one example of a 2-D time-dependent image;

DESCRIPTION OF THE PREFERRED EMBODIMENTS

One embodiment of a apparatus for displaying medical images in accordance with the present invention will now be described with reference to FIG. 1 to FIG. 7.

Figure 1:
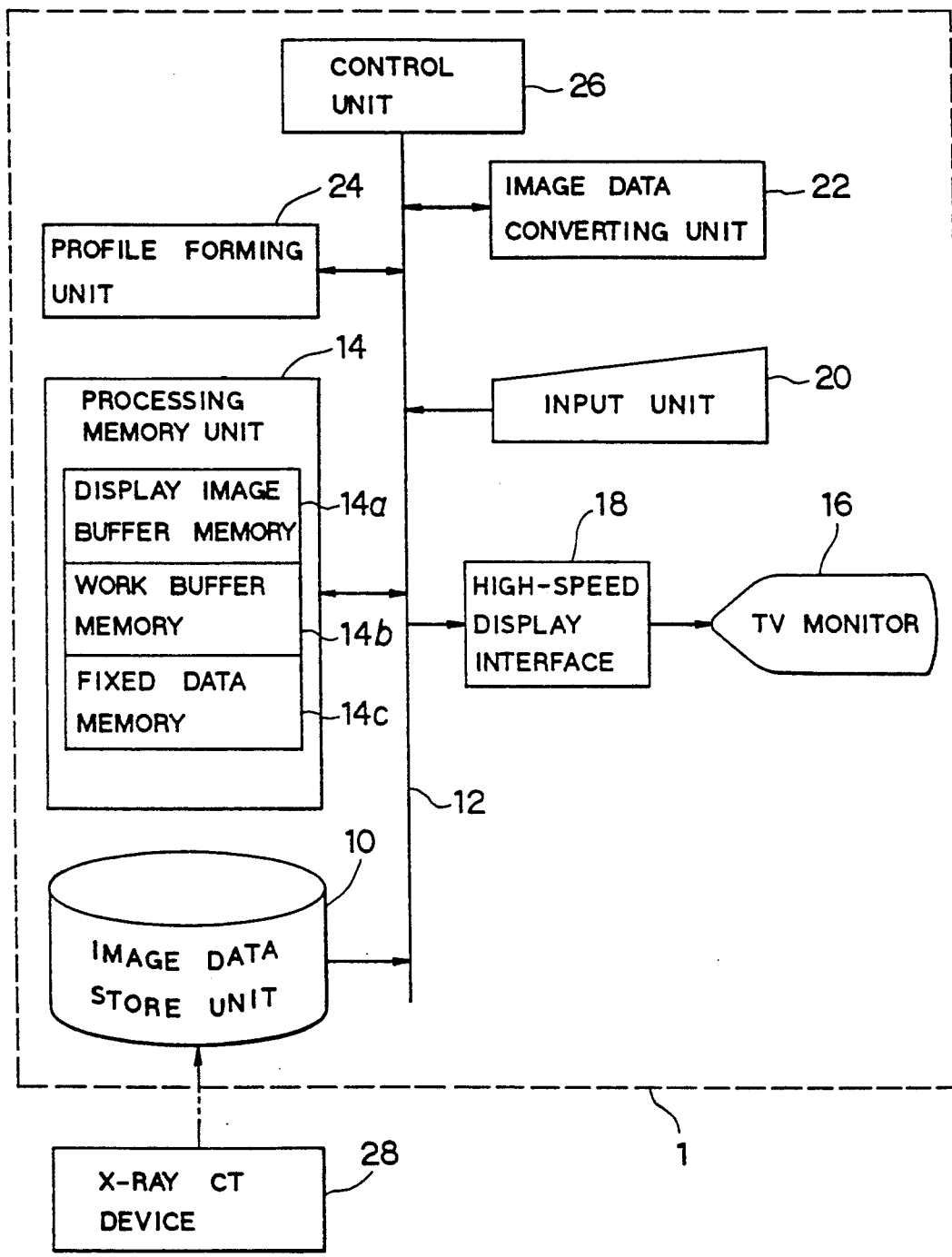
FIG. 1 is a schematic block diagram of a medical image display apparatus according to a preferred embodiment of the present invention.

The apparatus is generally designated by reference numeral 1 in FIG. 1. The apparatus 1 comprises an image data store unit 10 connected to a bus 12, a processing memory unit 14 connected to the bus 12, a TV monitor 16 operatively connected to the bus 12 through a fast-speed display interface 18, an input unit 20 connected to the bus 12, an image data converting unit 22 connected to the bus 12, a profile forming unit 24 connected to the bus 12, and a control unit 26 connected to the bus 12.

Figures 4A, 4C:
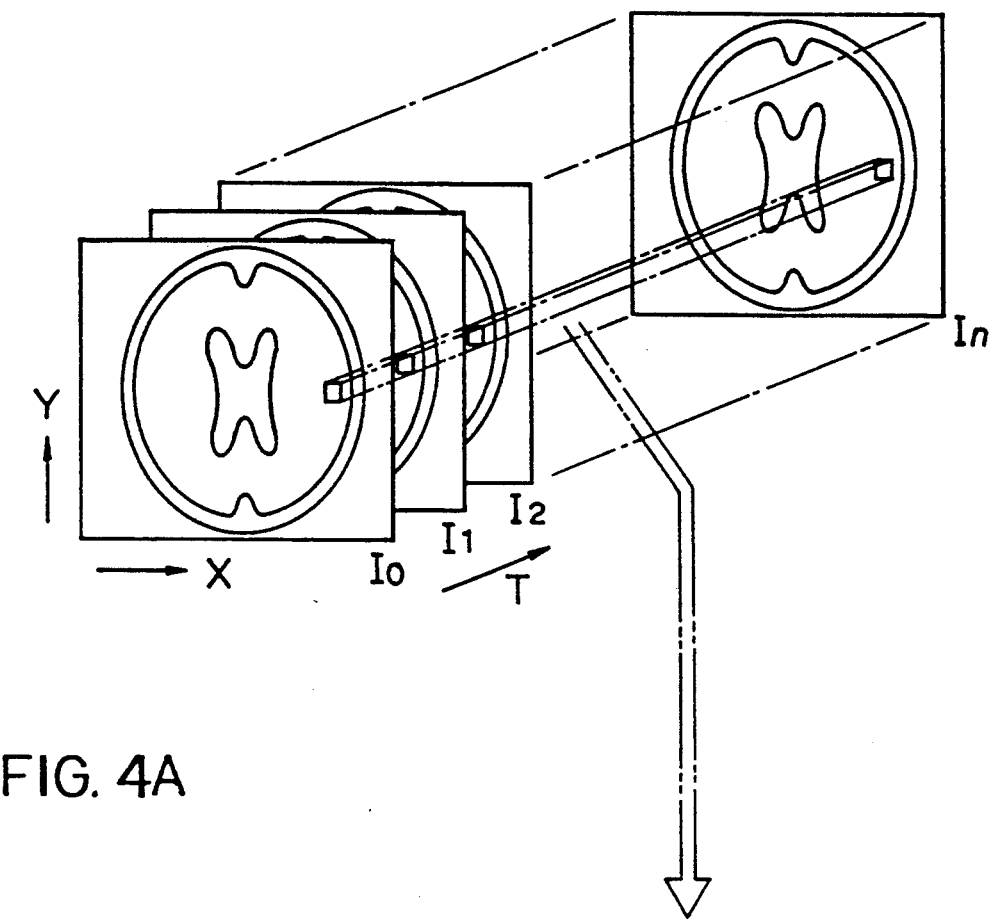
FIG. 4A represents a pictorial structure of a 3-D time-dependent image data collected by the medical imaging system.
FIG. 4C represents a time curve(i.e., profile) of the CT values versus the scanning time according to the alignment of the pixels in FIG. 4B.

The image data store unit 10 in this embodiment is also connected to an X-ray CT device 28 as a medical imaging system, and has stored numerous patient image data transmitted from the X-ray CT device 28. Each of patient image data is composed of not only her or his own image data I(: $I_o \sim I_n$) showing CT values (i.e. the density deviation of contrast medium) but also private information such as her or his name, sequential reception number, weight and height. Individual image data is made up of a three-dimensional(X,Y,T) time-dependent image data I as shown in FIG. 4A, where T depicts the time axis. The 3-D image data I can be produced by a plurality of scannings and collecting the resulting data along the time axis T. Those scannings are performed at a fixed slicing tissue of a patient to be examined by a certain time interval. The slicing tissue can be set to be parallel to the X-Y plane, when the Z axis of a Cartesian coordinate system is aligned with the longitudinal axis of the patient body.

Figure 4B:
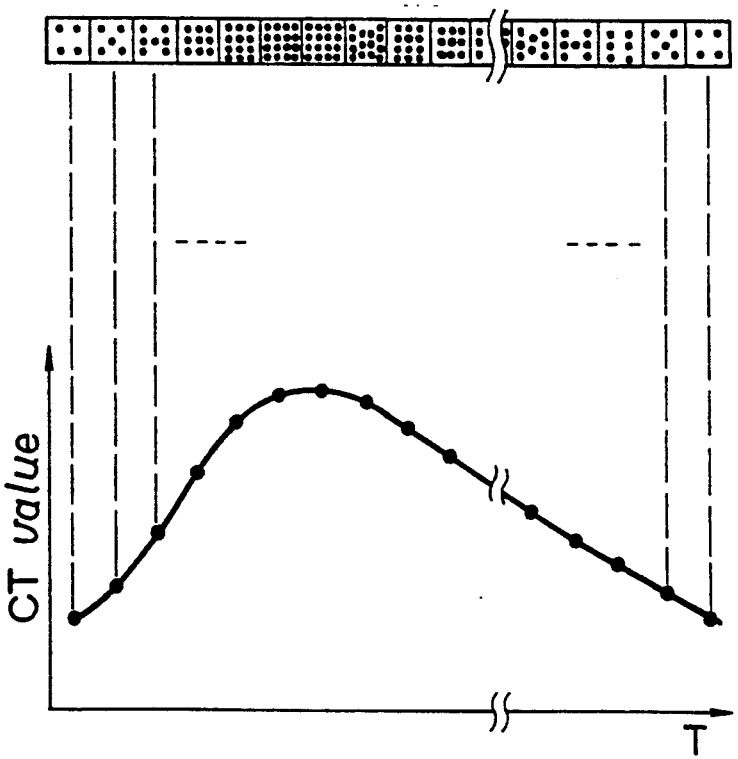
FIG. 4B represents a series of pixels collected through a fixed X-Y position in the 3-D time-dependent image data shown in FIG. 4A and aligned with the scanning time.

FIG. 4B shows an alignment of pixels for more precise description of the character of the 3-D time-dependent image data I. The alignment may be produced by extracting each pixel corresponding to an fixed position through respective scanned 2-D image data $I_o \sim I_n$ and arranging those pixels along the time axis T. Hence, it is understood that the alignment has information which shows changing CT values with a scanning time. In FIG. 4B, the degree of the CT values is represented schematically by difference in the number of dots.

The processing memory unit 14 is provided with ROM(Read Only Memory) and RAM(Random Access Memory) and is functionally composed of a display image buffer memory 14a, a work buffer memory 14b and a fixed data memory 14c. The fixed data memory 14c stores predetermined program and data necessary for operating the apparatus 1. The display image buffer memory 14a is utilized to temporarily store data come out of by processing in the work buffer memory 14b. The image data stored in the memory 14a then can be supplied to the TV monitor 16 through the fast-speed display interface 18 in response to a display command. The work buffer memory 14b is capable of temporarily storing the data from the image data store unit 10 as well as the data generated in the processing by the aforementioned image data converting unit 22 profile forming unit 24 and control unit 26. The combination of the memory 14a incorporated in the processing memory unit 14 and the fast-speed display interface 18 permits processed image data to be supplied to the TV monitor 16 at a very fast speed, and the image can be displayed on the monitor 16 in almost real time.

The TV monitor 16 may be constituted of a cathode-ray tube(CRT), and be able to display images based on the data coming through the interface 18.

The input unit 20 incorporates a key board, a mouse, etc., so that operators are able to input various instructions including a patient-specifying information, line information Li, Lp to be detailed later, and display commands.

Figure 3A:
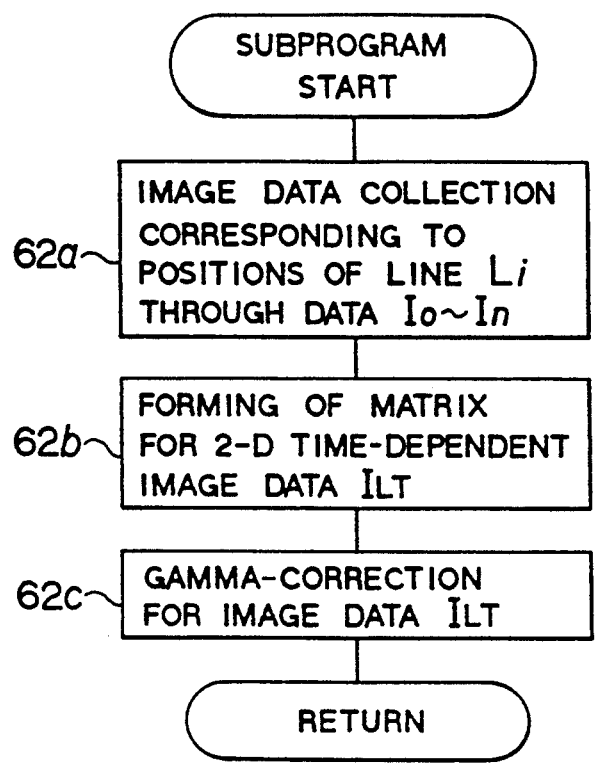
FIG. 3A is an flowchart representing performance of the image data converting unit incorporated in the display apparatus shown in FIG. 1.

The image data converting unit 22 acts as a first local processor when the control unit 26 is activated, and will perform a first subprogram shown in FIG. 3A. The unit 22 is then in charge of converting the 3-D time-dependent image data I stored in the memory 14b into a 2-D time-dependent image data $I_{LT}(L_{in}, T)$ where $L_{in}$ shows a position on a later detailed selecting line Li and T shows a scanning time.

Figure 3B:
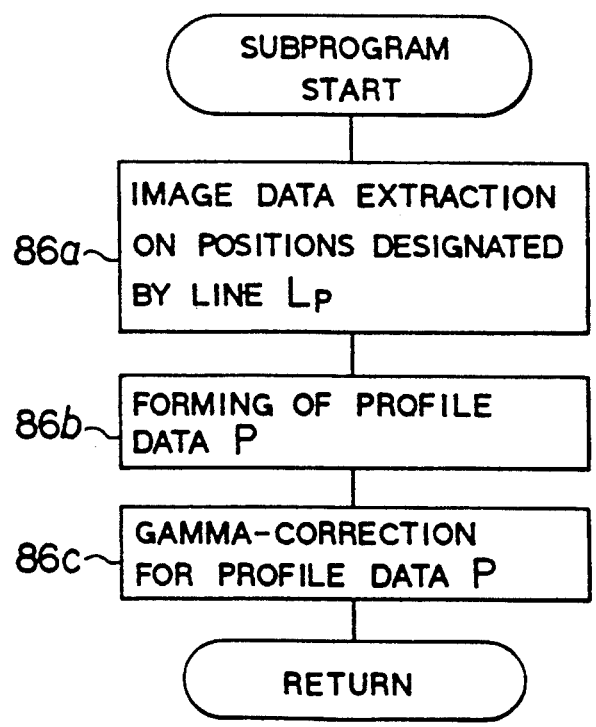
FIG. 3B is a flowchart representing performance of the profile forming unit incorporated in the display apparatus shown in FIG. 1.

The profile forming unit 24 acts as a second local processor, and will immediately proceed to a second subprogram shown in FIG. 3B, when receiving an operating command. Using the 2-D time-dependent image data $I_{LT}$ stored in the memory 14b and a later detailed profile line Lp designated by an operator, the profile forming unit 24 is able to form a profile data P(ct,T) of CT values at a position specified by the line Lp. The formed profile data P will be again stored in the memory 14b. The symbol ct expresses a CT value.

The control unit 26 functions as a central processing unit(CPU) so as to control the operation of the above-described all units, when activated. This control unit 26 is able to take in a predetermined main program (shown in FIG. 2) stored in the fixed data memory 14c and perform the taken-in program consecutively.

Referring now to the flowcharts in FIGS. 2, 3A and 3B, a series of processes carried out by the control unit 26, the image data converting unit 22, and the profile forming unit 24 will now be explained.

Figure 2:
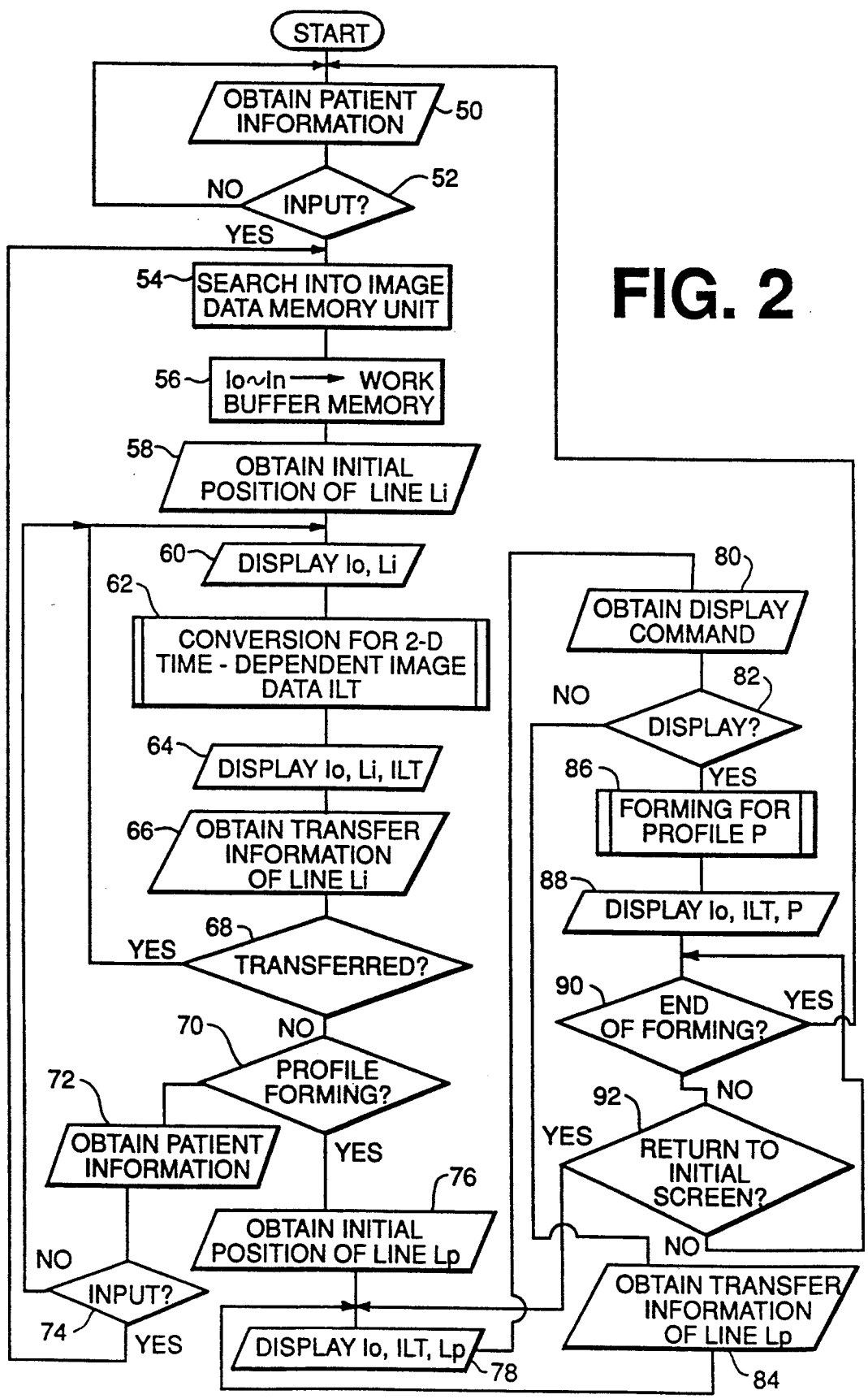
FIG. 2 is a flowchart representing performance of the control unit incorporated in the display apparatus shown in FIG. 1.

When the control unit 26 is initiated, in the first Step 50 of FIG. 2, the control unit 26 will try to take in fixed information of an examining patient which might be given by an operator via the input unit 20 the information includes a patient name and sequential reception number for specification. Then, in Step 52, the control unit 26 judges whether the information showing the examining patient comes in or not. If judged NO(i.e., the information not given) in Step 52, the processes of the Step 50 and 52 will be repeated for waiting.

When judged YES(i.e., the information given) in Step 52, the processing then proceed to Step 54 in the control unit 26. In Step 52, a 3-D time-dependent image data $I(X,Y,T)$ which corresponds to a designated patient is searched among the massive image data stored in the image data store unit 10. In the next Step 56, the searched data $I(X,Y,T)$ consisting of a plurality of scanned 2-D$(X,Y)$ image data $I_o \sim I_n$ as shown in FIG. 4A will be then transferred into the work buffer memory 14b and stored therein.

Then, in Step 58, a predetermined initial position of a display-selecting line Li is taken in by the control unit 26 from the fixed data memory 14c. In Step 60, a scanned 2-D image data $I_o$, as a representative of all scanned 2-D time-dependent image data $I_o \sim I_n$ can be shown on the TV monitor 16 on condition that the display-selecting line Li is superimposed therein, as shown in FIG. 5. In FIG. 5, the line Li is set so as to be parallel to the Y axis of a Cartesian coordinate system, when the Z axis of it is aligned with the longitudinal axis of the patient.

The control unit 26 then proceeds to Step 62 and gives a signal to the image data converting unit 22 to convert a 2-D time-dependent image data $I_{LT}$. In response to the signal, the unit 22 will consecutively perform the processes depicted in FIG. 3A.

In the first Step 62a of FIG. 3A, the image data converting unit 22 looks into the respective scanned 2-D image data $I_o \sim I_n$ and collects image data from designated positions through the image data $I_o \sim I_n$, where the positions are designated by the display-selecting line Li on the sliced tissue(i.e., X-Y plane). Then in Step 62b, a matrix expressing CT values $ct_{nn}$ varied with the scanning time at the designated line, i.e., a time-dependent image data $I_{LT}(L_{in},T)$, is formed as shown in FIG. 6A. In Step 62c, gamma interpolations are made at assumed timings between two adjacent scans to add some short CT values into the image data $I_{LT}(L_{in},T)$. This series of the gamma interpolations permits a sufficient continuation in the CT values versus the scanning time, even if the scanning frequency is rough. The process using the gamma interpolation may be omitted, when a high-speed scanning would be made. The final 2-D time-dependent data $I_{LT}$ formed above is then stored in the display image buffer memory 14a.

After completing the conversion of the time-dependent image data, the processing will be returned to the control unit 26, namely to Step 64 in FIG. 2. In Step 64, the scanned 2-D image data $I_o(X,Y)$ superimposed with the display-selecting line Li and the converted 2-D time-dependent image data $I_{LT}(L_{in},T)$ are transferred from the display image buffer memory 14a to the TV monitor 16 via the interface 18, and being displayed separately on the TV monitor 16.

The 2-D time-dependent image data $I_{LT}(L_{in},T)$ will be appeared on the screen, for example, like shown schematically in FIG. 6B. FIG. 6B has a vertical axis corresponding to the positions on the display-selecting line Li and a horizontal axis corresponding to the scanning time, and hence a density of each pixel on the screen expresses a CT value. Practically, the density of the pixels is composed of plural degrees of having high accuracy in accordance with CT values (FIG. 6B omits the display having a plurality of density degrees and typically shows the densest position on a line as a thickened portion for an easy understanding of CT values). The displayed image teaches that denser a pixel is, more quantitative the passing contrast medium is.

Therefore, observing the density of the screen on the TV monitor 16 will surely lead to an understanding of time variation about the CT values on the position designated by the display-selecting line Li. In other words, operators can directly examine the diseased part in wider or longer scope than conventional ROIs in addition to less operations.

Then, the control unit 26 goes on to Step 66 and 68. In Step 66, again, signals showing the transfer of the display-selecting line Li is taken in from the input unit 20. In Step 68, whether the position of the line Li is changed or not is judged. If YES in Step 68 (i.e., the line position changed), the processing will be returned to the aforementioned Step 60, the processes of Step 60 to 66 being repeated with reference to a newly revised position. Those processes will create a new 2-D time-dependent image $I_{LT}$ for the new designated position on the monitor 16 in a slight delay after the operation.

When NO in Step 68, it is recognized that operators will not alter the line position. Then, in Step 70, whether a profile of CT values should be make or not is determined by checking signals from the input unit 20. If NO in Step 70 (i.e., another patient not designated), the processing of the control unit 26 will return to Step 60. However, YES in Step 74(i.e., another patient designated), the processing of the control unit 26 will return to Step 54, and the above processes being repeated.

If judged YES in Step 70 (i.e., forming the profile), the control unit 26 goes on to step 76. In Step 76, the initial position of a profile-selecting line Lp is taken in from the fixed data memory 14c. In the next step 78, the line Lp is displayed and superimposed with a 2-D time-dependent image data which is the newly revised one at that time (refer to FIG. 7A). Moreover, in Step 80, a command for executing the profile forming is taken in from the input unit 20, and in Step 82, to form or not to form the profile is determined to either side. The judge of nonforming the profile in Step 82 (i.e., NO) forces the processing to proceed to Step 78 via Step 84. In Step 84, a signal commanding altered positions of the profile-selecting line Lp is taken in.

To the contrary, the judge of forming the profile in Step 82 (i.e., YES) will lead to the processing of Step 86. In Step 86, the control unit 26 gives an instruction to the profile forming unit 24 so as to form a profile of CT values.

The processing in the profile forming unit 24 is typically like one as indicated in FIG. 3B. In Step 86a of FIG. 3B, the image data which correspond to the position of the line Lp($=L_{in}$) on the matrix of a 2-D image data $I_{LT}$ are extracted and taken in. In Step 86b, a profile data P($ct_{nn}$, T) having two dimensions, the scanning time T and the CT value $ct_{nn}$ corresponding to the scanning time T, can be formed in the work buffer memory 14b with reference to the designated line Lp. Moreover, in Step 86c, gamma interpolations are also made at some assumed timings between two adjacent scans for a sufficient continuation of profile data P($ct_{nn}$,T). The process of the gamma interpolations may be omitted, when high-speed scanning would be done.

Figure 7A:
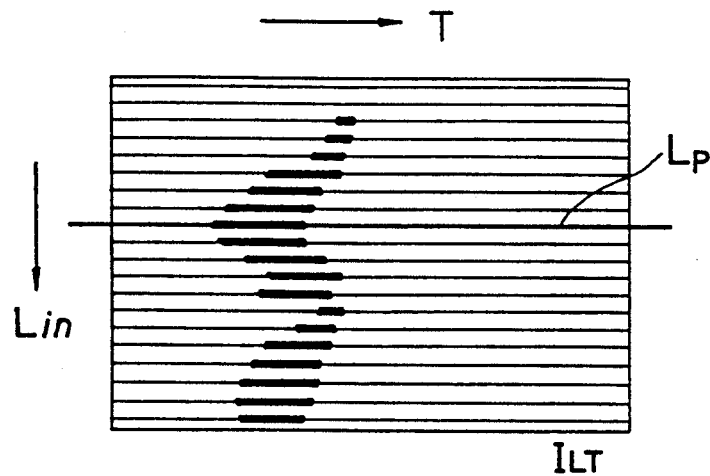
FIG. 7A is a display illustration representing one example of a profile-selecting line on a 2-D time-dependent image.
Figure 7B:
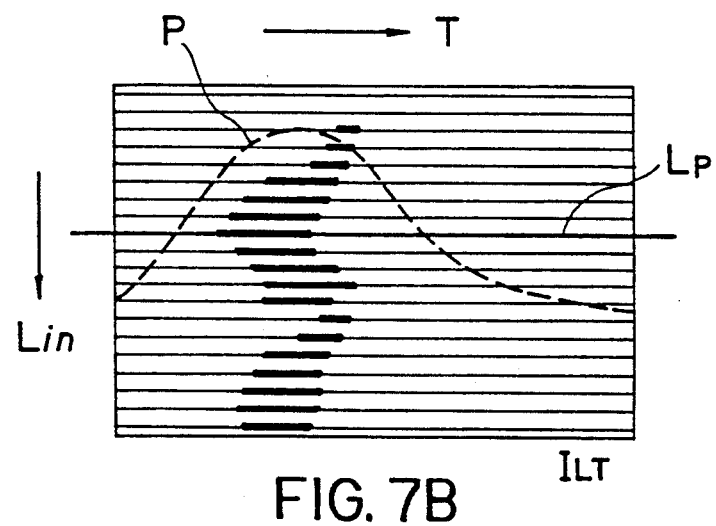
FIG. 7B is a display illustration representing one example of a profile(time curve) of CT values shown on the 2-D time-dependent image.

After the completion of the above subprogram, the processing will be returned to the control unit 26 and Step 88 in FIG. 2 will be done. In Step 88, the scanned 2-D image data $I_o$ and the 2-D time-dependent image data $I_{LT}$ superimposed with the formed profile data P is shown separately on the TV monitor 16. FIG. 7B shows one example of the profile P. Hence, the profile P shown on the monitor 16 will provide a quantitative understanding of CT values at a pointed line position $L_{in}$ in a short time after the operations.

Then, the processing of Step 90 and 92 will be performed with signals from the input unit 20. In Step 90, termination of the profile forming will be determined, and the processing will be returned to Step 50 if the termination is decided. If NO (nonterminating) in Step 90, whether it should be returned to the screen shown before the profile forming or not will be followed in Step 92. The judge YES in Step 92 leads to Step 78, and NO leads to Step 90 again for waiting.

As apparent from the foregoing descriptions, the present invention is not limited to the above-described preferred embodiment, but may be modified, changed, and substituted without departing from the technical scope of the present invention.

Figure 8:
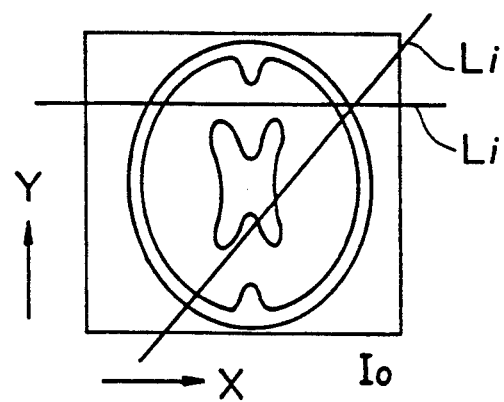
FIG. 8 is a illustration showing display-selecting lines in another embodiment.
Figure 9A:
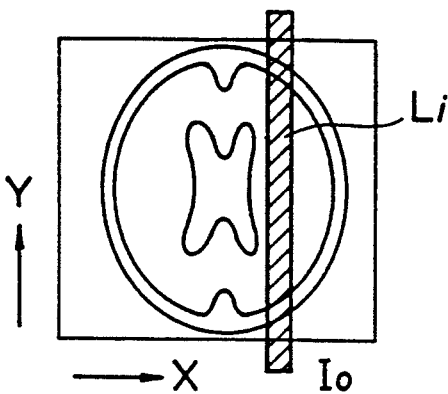
FIG. 9A represents a rectangular ROI in another embodiment.
Figure 9B:
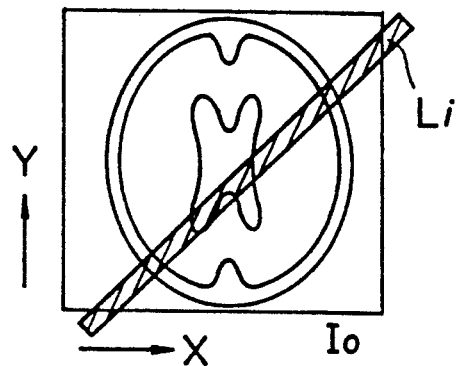
FIG. 9B shows a rectangular ROI set to be oblique to the axes in another embodiment.
Figure 9C:
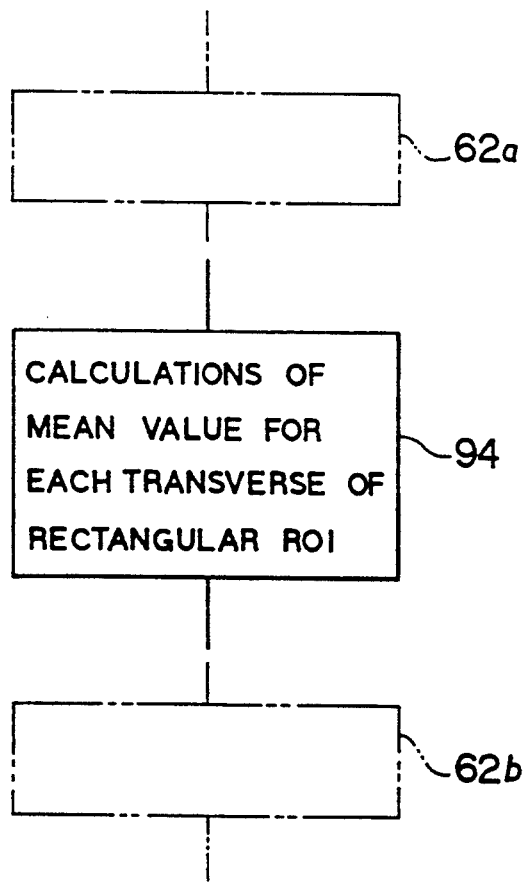
FIG. 9C shows a partial performance of the image data converting unit in another embodiment, where a rectangular ROI is designated.

For instance, in the above-described preferred embodiment, the ROI(region of interest), i.e., the display-selecting line Li, was set to be parallel to the Y axis of a Cartesian coordinate system. Alteratively, the line Li may be set to be parallel to the X axis or may be set to be oblique to the axes as represented in FIG. 8. Moreover, the ROI may be designated as a rectangular shape, like typically illustrated in FIG. 9A and 9B, consisting of a plurality of pixel series which are adjacent and run through in a direction parallel to the axis or a direction oblique to the axes, instead of one pixel series. In a manner employing the rectangular ROI, a mean value as a representative value for the image data (i.g., CT values) existing on lines perpendicular to the elongated direction can be calculated by using a calculation step 94 in FIG. 9C, which must be inserted into the two steps 62a and 62b in FIG. 3A. Further, the ROI may be designated as a segment on the display screen.

Furthermore, the profile-selecting line Lp, which will points at an medically interested line position, may employ a dot, an arrow, or any other symbols instead of a line.

Furthermore, the TV monitor may be usable in separate displaying of the scanned 2-D image $I_o$ as one of the 3-D time-varying image data I, the 2-D time-varying image $I_{LT}$, and the profile P.

Furthermore, there may be utilized a modification in which the profile forming function is not provided by omitting Steps 70 and 76 to 92 in FIG. 2.

Still furthermore, in the present invention, the medical imaging system, which supplies medical image to the medical data store unit of the above-described apparatus, may not be limited to an X-ray device. Instead of the X-ray device, a nuclear magnetic resonance (NMR) device and nuclear medicine (NM) device can be also adopted, wherein image data represent changes in density of nucleus and changes in density of RI (radioisotope) of a patient body respectively.

What we claim is:

1. A method of displaying medical images comprising:

storing three-dimensional time-dependent image data consisting of a plurality of two-dimensional image data collected throughout a sliced tissue in a biological body to be examined by dynamic scanning of a certain time interval;

displaying one of said plurality of scanned two-dimensional image data;

designating a region of interest elongated along a direction on the two-dimensional image displayed;

converting said three-dimensional time-dependent image data to a two-dimensional time-dependent image data having two aces, one axis representing the scanning time, the other axis representing, at each scan, a position in the designated region of interest;

displaying the converted two-dimensional time-dependent image data;

designating a position on the position axis of the displayed two-dimensional time-dependent image;

forming a profile data of the image data values along a line perpendicular to the designated position on the position axis; and displaying the formed profile data.

2. An apparatus for displaying medical images, comprising:

means for storing three-dimensional time-dependent image data consisting of a plurality of two-dimensional image data collected throughout a sliced two-dimensional tissue in a biological body to be examined by dynamic scanning of a certain time interval;

first means for displaying one of said plurality of scanned two-dimensional image data;

first means for designating a region of interest elongated along a direction on the two-dimensional image displayed by the first displaying means;

means for converting said three-dimensional time-dependent image data to a two-dimensional time-dependent image data having two axes, one axis representing scanning time, the other axis representing, at each scan, a position in the region of interest designated by the first designating means;

second means for displaying the two-dimensional time-dependent image data converted by the image data converting means;

second means for designating a position on the position axis of the two-dimensional time-dependent image displayed by the second displaying means;

means for forming a profile data of image data values along a line perpendicular to the position on the position axis designated by the second designating means; and third means for displaying the profile data formed by the profile data forming means.

3. An apparatus as claimed in claim 2, wherein the profile data forming means includes means for fitting image data between the scanning intervals by using a gamma interpolation.

4. An apparatus as claimed in claim 2, wherein the region of interest is a linear region of interest.

5. An apparatus as claimed in claim 2, wherein the region of interest is a rectangular region of interest.

6. An apparatus as claimed in claim 5, wherein the image data converting means includes means for calculating mean values representative of values on lines perpendicular to the elongated reaction of the rectangular region of interest.

7. An apparatus as claimed in claim 2, wherein the first displaying means, the second displaying means, and the third displaying means use a common display.

8. An apparatus as claimed in claim 7, wherein the third displaying means includes means for superimposing the profile data on the two-dimensional time-dependent image.

9. An apparatus as claimed in claim 2, wherein a medical imaging system supplies the three-dimensional time-dependent image data to the image data storing means.

10. An apparatus as claimed in claim 9, wherein the medical imaging system employs an X-ray computed tomography device.

11. An apparatus as claimed in claim 2, wherein the image data converting means has means for fitting image data between the scanning intervals by using a gamma interpolation.

* * * * *

UNITED STATES PATENT AND TRADEMARK OFFICE
CERTIFICATE OF CORRECTION

PATENT NO. : 5,297,215
DATED : March 22, 1994
INVENTOR(S) : Ichiro Yamagishi

It is certified that error appears in the above-indentified patent and that said Letters Patent is hereby corrected as shown below:

Abstract, line 1, after "utilizing a" insert --stored--.

Abstract, line 6, change "patient" to --patient's--.

Abstract, line 6, change "an" to --a--.

Claim 1, column 8, line 27, change "aces" to --axes--.

Claim 6, column 9, line 14, change "reaction"

to --direction--.

Signed and Sealed this

Fourth Day of April, 1995

Attest:

BRUCE LEHMAN

*Attesting Officer*  *Commissioner of Patents and Trademarks*